US010563387B1

(12) United States Patent
Iocco

(10) Patent No.: US 10,563,387 B1
(45) Date of Patent: Feb. 18, 2020

(54) RAPID-INSTALL UNDERMOUNT SINK BRACKET

(71) Applicant: Augustine Albert Iocco, Harrison City, PA (US)

(72) Inventor: Augustine Albert Iocco, Harrison City, PA (US)

( * ) Notice: Subject to any disclaimer, the term of this patent is extended or adjusted under 35 U.S.C. 154(b) by 0 days.

(21) Appl. No.: 16/510,902

(22) Filed: Jul. 13, 2019

(51) Int. Cl.
*E03C 1/33* (2006.01)
*F16M 13/02* (2006.01)
*E03C 1/324* (2006.01)

(52) U.S. Cl.
CPC ............... *E03C 1/324* (2013.01); *E03C 1/33* (2013.01); *F16M 13/022* (2013.01)

(58) Field of Classification Search
CPC ... E03C 1/32; E03C 1/33; E03C 1/322; E03C 1/324; E03C 1/335; F16M 3/022
USPC .......... 108/147.11, 147.16, 147.17; 248/244, 248/295.11, 544; 312/140.1, 140.3, 312/140.4; 29/890.141; 4/631–635, 645, 4/647–649
See application file for complete search history.

(56) References Cited

U.S. PATENT DOCUMENTS

| | | | | |
|---|---|---|---|---|
| 139,408 A * | 5/1873 | Meigs | ................... | A47B 57/567 248/244 |
| 277,510 A * | 5/1883 | Roberts | ................... | A47B 57/26 108/106 |
| 391,438 A * | 10/1888 | Horn | ................... | A47B 57/567 248/244 |
| 498,945 A * | 6/1893 | Smith | ................... | A47B 57/567 248/244 |
| 515,836 A * | 3/1894 | Mueller | ................... | E03C 1/33 4/649 |
| 565,539 A * | 8/1896 | Hartzell | ................... | A47B 57/567 248/244 |
| 569,640 A * | 10/1896 | Hartzell | ................... | A47B 57/567 248/244 |
| 845,917 A * | 3/1907 | Worley | ................... | A47B 96/067 211/90.02 |
| 1,066,806 A * | 7/1913 | Freud | ................... | A47B 57/567 248/244 |
| 1,135,181 A * | 4/1915 | Hastrieter | ................... | A47H 7/02 211/102 |
| 2,457,373 A * | 12/1948 | Hunter | ................... | A47B 5/02 248/244 |
| 3,008,150 A * | 11/1961 | Lyon, Jr. | ................... | E03C 1/335 4/650 |
| 3,022,519 A * | 2/1962 | Lang | ................... | E03C 1/33 4/650 |
| 3,583,002 A * | 6/1971 | Roberts | ................... | E03C 1/33 4/636 |
| 3,813,707 A * | 6/1974 | Fowell | ................... | E03C 1/33 4/650 |
| 4,340,199 A * | 7/1982 | Brock | ................... | A47G 1/215 248/222.11 |
| 5,653,550 A * | 8/1997 | Mutz | ................... | E03C 1/33 403/329 |

(Continued)

*Primary Examiner* — Joshua E Rodden

(57) ABSTRACT

An adjustable sink positioning and mounting apparatus for rapidly attaching sinks to the bottom of a counter top includes a channel base member with ratchet teeth and a sliding sled member releasably engaged with the ratchet base channel. The channel base member includes a top-end clip and the sliding sled member includes an arm adjacent the top end and at least one foot tab with a curved tip at the lower end.

6 Claims, 5 Drawing Sheets

(56) References Cited

U.S. PATENT DOCUMENTS

| | | | |
|---|---|---|---|
| 6,105,182 A * | 8/2000 | Elnar | A61H 7/00 |
| | | | 248/125.3 |
| 8,356,367 B2 | 1/2013 | Flynn | |
| 9,290,919 B2 | 3/2016 | Blaine | |
| 10,184,236 B2 * | 1/2019 | Xu | E03C 1/335 |
| 2010/0301175 A1 | 12/2010 | Grayson | |
| 2011/0272549 A1 * | 11/2011 | Benz | A47B 57/562 |
| | | | 248/244 |
| 2015/0272353 A1 * | 10/2015 | Christodoulou | A47G 1/202 |
| | | | 29/525.01 |

* cited by examiner

RAPID-INSTALL UNDERMOUNT SINK BRACKET

FIELD OF THE INVENTION

The present invention relates, in general, to the attachment of under-mount sinks and more particularly, this invention relates to the rapid mounting and securing of under-mount sinks to counter tops.

BACKGROUND OF THE INVENTION

The attaching of under-mount sinks beneath counter tops has always been laborious and time consuming. There are many methods and a variety of installation techniques. The many models of sinks available in the market place pose different types of installation techniques. Information relevant to attempts to address this problem can be found in a few exemplary types of cross members. One suitable for the purpose of supporting sinks is described in U.S. Pat. No. 7,429,021. Another exemplary cross member suitable for use as a sink support is described in U.S. Pat. No. 5,538,206. But none of these examples of prior art have addressed the supporting of the front of a sink. Blaine in U.S. Pat. No. 9,290,919 discloses a fixed length support member that can be fastened at one end to a cabinet wall such as to hold up undermount sinks, but with no adjustment provisions once installed.

SUMMARY OF THE INVENTION

The present invention provides an apparatus and method of adjustably securing a sink to the bottom of a counter top and includes an elongated channel base member a curving metal clip at the top of the channel base member and at least one column of ratchet teeth in the middle section. A movable sled member engages with edge channels on the channel base member and includes a sink-contact arm at an upper end and at least one foot tab at a lower end, wherein the foot tab is configured to engage with the ratchet teeth such as to permit upward movement, but not in the down direction, unless the foot tab is temporarily pried free of the ratchet teeth.

OBJECTS OF THE INVENTION

It is, therefore, one of the primary object of the present invention to provide a fast, very easy, effective, efficient, simple and economical way of attaching and tightly securing an under mount sink to a countertop.

Another object of the present invention is to provide a self contained way of attachment requiring no external drilling, tapping, screwing, bolting, threading or adhesives but also allows the end user the option of securing the bracket by screws.

Still another object of the present invention is to provide 180° range of horizontal rotation turning the arm that will engage the sink flange.

An additional object of the present invention is to provide a faster action of adjustable vertical range of motion to engage the bracket with the sink flange by way of a sliding ratchet mechanism.

Still another object of the present invention is to provide variable height adjustment, which allows the sink to be cradled below the countertop. This allows an open window for the application of sink sealant. The sink is then raised to meet with the bottom of the countertop.

An additional object of the present invention is to provide a narrow-profile version of a bracket to support a sink where there is little clearance to work in the front region of the sink and side walls of the cabinetry.

In addition to the various objects and advantages of the present invention described with some degree of specificity above, it should be obvious that additional objects and advantages of the present invention will become more readily apparent to those persons who are skilled in the relevant art from the following more detailed descriptions of the invention, particularly, when such description is taken in conjunction with the attached drawing figures and with the appended claims.

Figure 1:
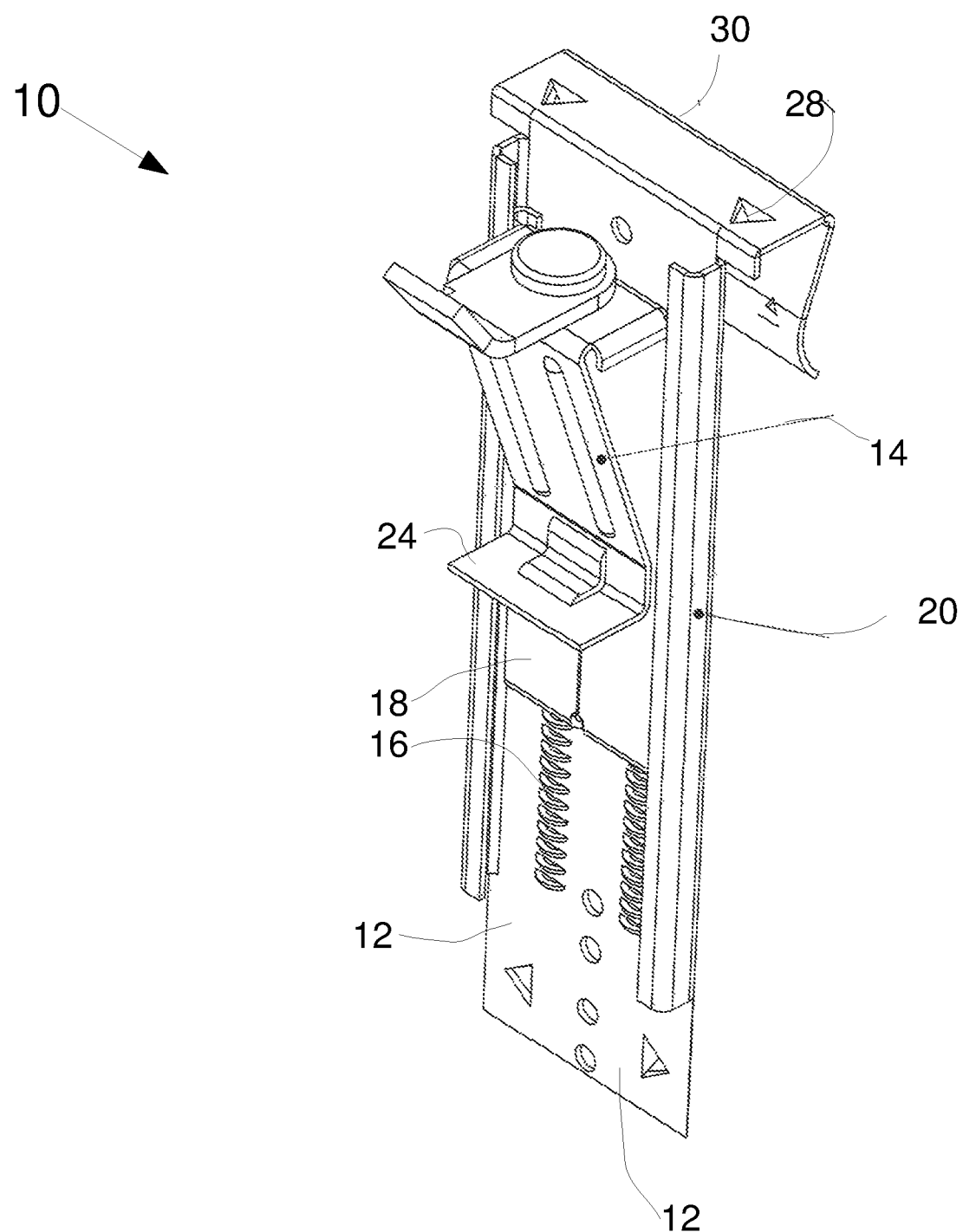
FIG. 1 illustrates a perspective side elevation view of a preferred embodiment of the present invention.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the figures.

Referring initially to FIG. 1, this provides a perspective view of a preferred embodiment of the present sink support bracket invention in use generally shows as 10. An elongated channel base member 12 has at a top end a inward curving thin gauge metal clip 30 fixed to the top of the back plate 13 of the channel base member 12, configured to compresses inward against a side cabinet wall compressing the wood cabinet. Metal clip 32 is pretensioned and is adjustable to meet different cabinet wall thicknesses, and in this same area are two points of no return one way stab-locks locks 28. The top of the bracket has two stab locks 28 to engage the top of the cabinet wall, this is to prevent sag when there is a load on arm 26. There are also two hammer-in type stab locks 28, adjacent the bottom end of the base member 12, to prevent counter rotation when there is a load on the sink-contact arm 26 in the fully retracted position. This method of attachment requires no external fasteners. The installed bracket is held in place vertically by the weight of the countertop and the stab locks. The main body of the base member 12 also includes at least one column of vertically oriented ratchet teeth 16 having a plurality of teeth 16 through a pair of parallel outwardly facing spaced apart columns of peripheral louvers or protrusions 16. By ratchet teeth is meant they permit movement across them in one direction, but not the other. The two columns preferably have the teeth staggered for finer adjustment of height. The sled member 14 adjusts vertically with at least one foot tab 18 at the bottom end, but preferably two, with curved tips that engage on the teeth 16 of the channel base member when sliding upward, but prevents downward movement. At the top end of the sled member 14 is a sink-contact arm 26, which preferably has an upward curving tip and an 180° adjustable horizontal range of motion to engage the rim of the sink.

Figure 2:
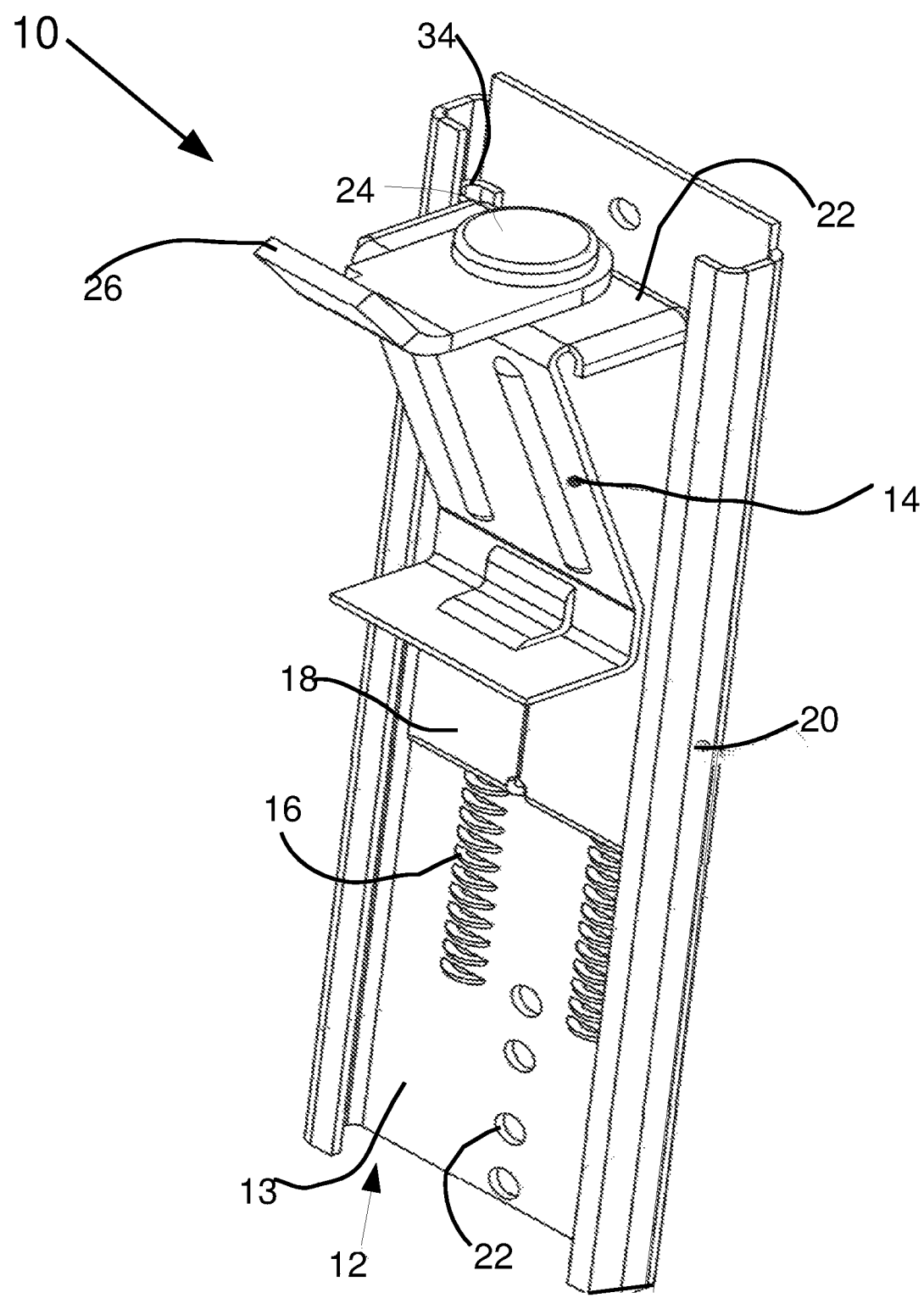
FIG. 2 provides a perspective view of an alternative embodiment of the present invention with a different method of wall attachment.

FIG. 2 provides a perspective profile view of an alternative embodiment of the present invention with a different method of wall attachment. The main body 12 shown without clip includes mounting apertures 22 in the planar back plate 13 that secures to a vertical surface by way of mounting screws (not shown) through the apertures 22. It is preferable but optional to have one or more adhesive pads (not shown) on the back side for ease of installation. This gives the end user the option to secure the device to a cabinet wall where the clip-on version shown in FIGS. 1 and 2 cannot be used. This figure also shows the preferred curved edges 34 of the sled member 14 configured for sliding engagement with the edge channels 20 of the channel base member 12.

Figure 3:
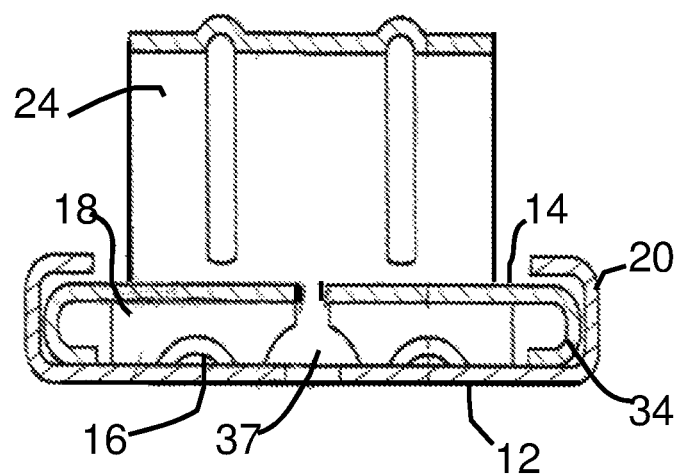
FIG. 3 provides an bottom end view of a key feature of the present invention.

FIG. 3 provides a bottom end view of a key feature for both embodiments of the present invention. The importance of this would not be obvious until one attempts to lower the sled member for height adjustment or removal of the sink because the ratchet teeth 16 do not allow for downward movement, just upward. To release the foot tab or tabs 18 of the sled member 14, a screwdriver or other tool is inserted in the notch opening 37 between the two foot tabs and pried outward to temporarily release the curved ends of the tabs 18 from the teeth 16. With just one foot tab, the notch 37 is cut into the curved bottom of the foot member Pulling down the lower flange 24 on the sled member 14 enables lowering the sled member while the foot tabs are still pried up. Removing the tool allows the foot tabs to re-engage with the ratchet teeth, or the sled member to be completely separated from the ratchet channel bracket.

Figure 4:
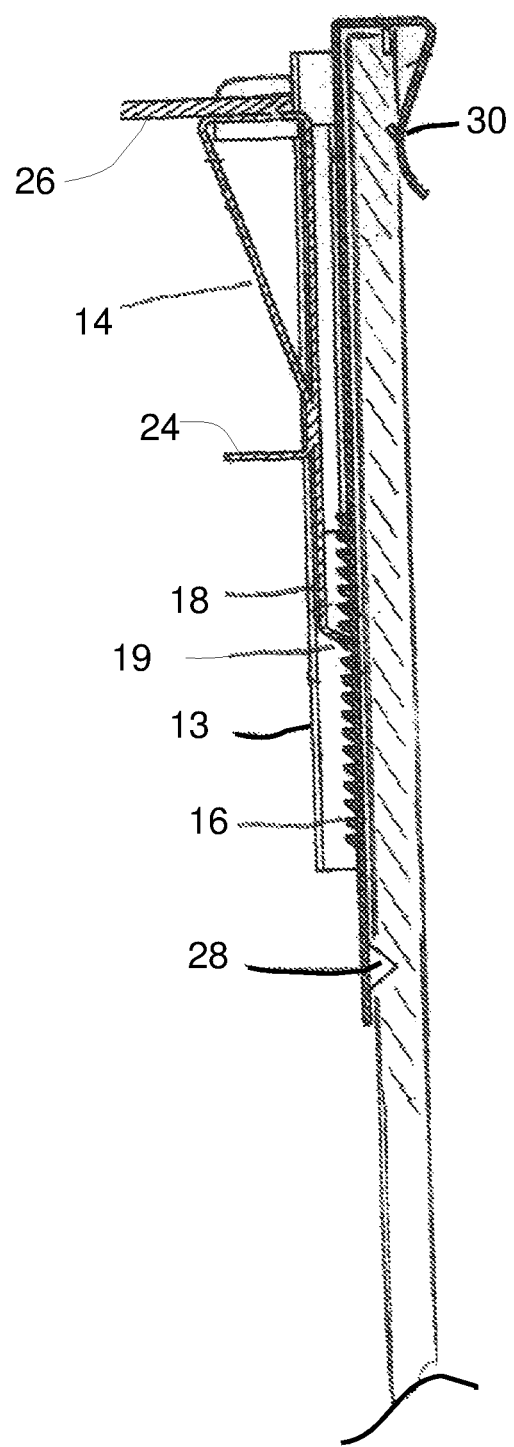
FIG. 4 is a side sectional elevation view of the preferred embodiment.

FIG. 4 is a side sectional elevation view of the preferred embodiment including the top clip 30. This view also shows the curved tip 19 of the foot member 18 which is the lower part of the sled member 14 in other figures. It also shows how the clip 30 engages the top of the cabinet wall and the stab-locks 28 are forced into the wall 50.

Figure 5:
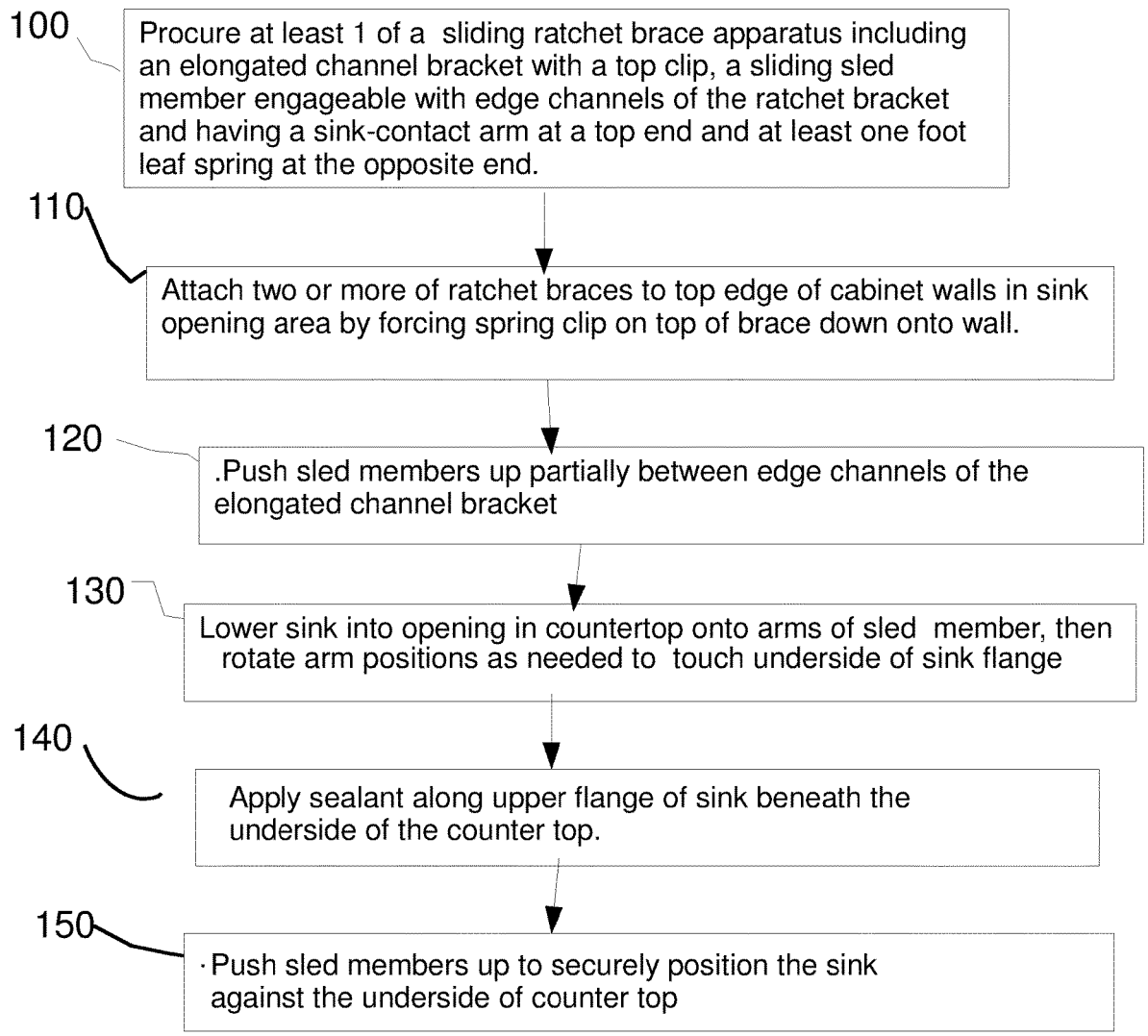
FIG. 5 provides a flow chart of a method for installing the preferred embodiment of the present invention.

FIG. 5 provides a flow chart of a method for installing the preferred embodiment starting with the procurement of the adjustable support brackets of the preferred embodiment at step 100. Subsequently, attaching at least two of adjustable support brackets to cabinet wall under the counter top, then lowering the sink through a counter top opening with the rim resting on the arms of the sled members. Next, applying a bead of sealant on the upper side of the sink rim, then manually pushing the sled members to adequately seal the sink rim to the underside of the counter top. If it becomes necessary to lower the sled members, a screwdriver tip can be inserted into the notch in the foot member tabs to pry the tips free of the teeth, after which the sled member can be pulled down to the desired position and the screwdriver removed.

What is claimed is:

1. An adjustable support apparatus for under-mount sinks comprising:
    a) an elongated channel base member configured for attachment to a cabinet wall wherein the channel base member includes channels on longitudinal sides of the elongated channel base member, a planar back plate with at least one column of ratchet teeth, and one of apertures and stab-locks in the planar back plate, and
    b) a sled member configured to movably engage within the channels of the channel base member, wherein the sled member has an arm adjacent a top end and at least one foot tab with curved tip adjacent a lower end, and wherein said curved tip of at least one foot tab of said sled member includes a notch in said curved tip configured for temporarily prying said curved tip free of said column of ratchet teeth.

2. The adjustable support apparatus of claim 1, wherein said planar back plate further includes a top end clip.

3. The adjustable support apparatus of claim 1, wherein said sled member further includes curved lateral edges configured for sliding with said channels on said channel base member.

4. The adjustable support apparatus of claim 1, wherein said at least one column of ratchet teeth is two spaced apart columns of at least S ratchet teeth each in staggered lateral alignment, said ratchet teeth configured for prevention of downward movement of said sled member.

5. The adjustable support apparatus of claim 1, wherein said at least one foot tab has two foot tabs with curved ends.

6. The adjustable support apparatus of claim 1, wherein said arm of said sled member has an upwardly curved distal end.

* * * * *